United States Patent
Battles et al.

(10) Patent No.: US 8,681,237 B2
(45) Date of Patent: Mar. 25, 2014

(54) IMAGE-CAPTURE PARAMETER VARIATION

(75) Inventors: Amy E. Battles, Windsor, CO (US); Murray Dean Craig, Johnstown, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 270 days.

(21) Appl. No.: 12/863,829

(22) PCT Filed: Jan. 23, 2008

(86) PCT No.: PCT/US2008/051757
§ 371 (c)(1), (2), (4) Date: Jul. 21, 2010

(87) PCT Pub. No.: WO2009/094022
PCT Pub. Date: Jul. 30, 2009

(65) Prior Publication Data
US 2010/0289916 A1    Nov. 18, 2010

(51) Int. Cl.
*H04N 5/228* (2006.01)
*H04N 9/73* (2006.01)

(52) U.S. Cl.
USPC .................................. 348/222.1; 348/224.1

(58) Field of Classification Search
None
See application file for complete search history.

(56) References Cited

U.S. PATENT DOCUMENTS

| | | | |
|---|---|---|---|
| 2005/0219391 A1 | 10/2005 | Sun et al. | |
| 2006/0215043 A1* | 9/2006 | Furukawa | 348/222.1 |
| 2006/0221223 A1* | 10/2006 | Terada | 348/333.05 |
| 2007/0160357 A1* | 7/2007 | Lin et al. | 396/65 |
| 2009/0263021 A1* | 10/2009 | Takamori et al. | 382/181 |
| 2010/0128146 A1* | 5/2010 | Nojima | 348/231.99 |
| 2011/0069214 A1* | 3/2011 | Nakano | 348/333.01 |
| 2012/0038792 A1* | 2/2012 | Nakase et al. | 348/231.2 |

FOREIGN PATENT DOCUMENTS

| | | |
|---|---|---|
| JP | 2002232751 A2 | 8/2002 |
| JP | 2003087608 A2 | 3/2003 |
| JP | 2005062370 A2 | 3/2005 |
| JP | 2006295244 A2 | 10/2006 |

OTHER PUBLICATIONS

International Search Report International Application No. PCT/US2010/051757. Filing Date Jan. 23, 2008. Date of Mailing Sep. 12, 2008.

\* cited by examiner

*Primary Examiner* — Lin Ye
*Assistant Examiner* — John H Morehead, III

(57) ABSTRACT

A camera includes a bracketing logic module that varies, based on a previously-received user input and for each shot of a plurality of bracketed shots for a scene to be imaged, one or more of a plurality of different image-capture parameters, wherein the bracketing logic module varies the one or more of the plurality of different image-capture parameters based on previously-input user selections of scene-bracketing for the scene to be imaged.

18 Claims, 3 Drawing Sheets

IMAGE-CAPTURE PARAMETER VARIATION

BACKGROUND

When exposing for a scene, a light meter of a camera may select an aperture and shutter speed combination for the picture. Exposure bracketing involves taking additional pictures at slight under-exposure and slight over-exposure. The camera might have been misled by the light available and the main subject may be over- or under-exposed in a particular image. Taking more shots allows compensation for the variation in lighting. In challenging scenes, however, exposure bracketing might not be sufficient to guarantee taking a picture that meets the customer's expectations.

Examples of scenes that are challenging for capturing good pictures include fast action, low light, night, indoor, backlit, and close-up. For example, a scene may be taken where there is an abundance of light around a target subject and a lesser amount of light illuminating the background. If the camera closes down the aperture using a faster shutter speed, the target subject might be under-exposed. An extra shot taken at slight over-exposure may properly expose the target subject but over-expose the surroundings. In another example, a scene may be taken where the background might be too dark. Where a camera exposes for the lack of light by opening up the aperture and/or using a slower shutter speed, the target subject might be over-exposed. An extra shot taken at slight under-exposure may properly expose the target subject but under-expose the surroundings. In both of these examples, better results might be obtained by changing other settings besides exposure.

DESCRIPTION OF THE DRAWINGS

Features of exemplary embodiments will become apparent from the description, the claims, and the accompanying drawings in which:

DETAILED DESCRIPTION

Referring to the BACKGROUND section above, it may be desirable for the camera to pick the best parameters to adjust based on the scene with minimal user input. The camera may apply intelligence about the scene in selecting setting the parameters to be adjusted. Different parameters may be varied to get the best shot. After receiving input selections from the user to place the camera into a scene bracketing mode, the camera may take multiple shots while varying various parameters without further input by the user.

Figure 1:
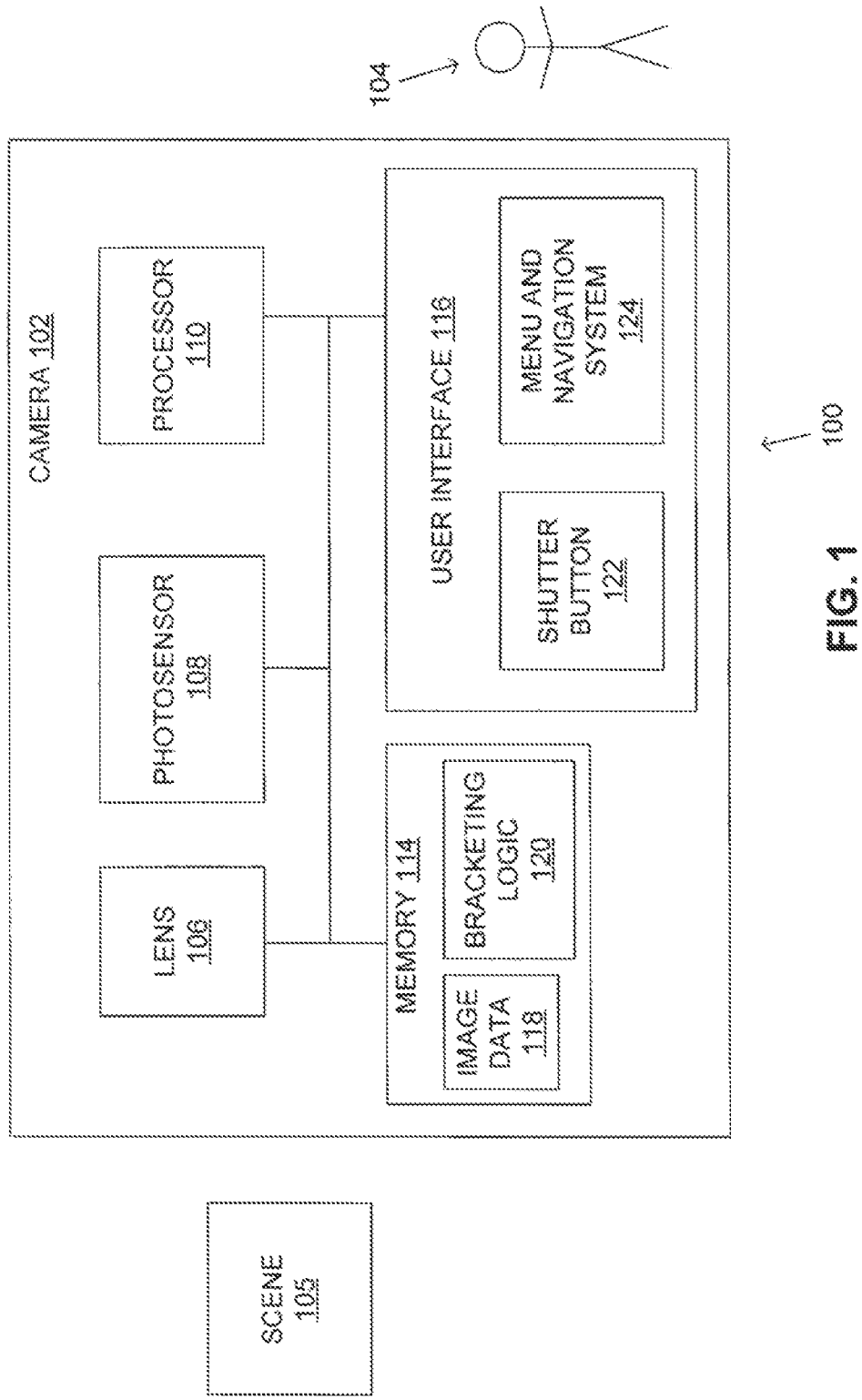
FIG. 1 is a representation of an embodiment of an apparatus that comprises a camera present with a user and a scene.

Turning to FIG. 1, an embodiment of an apparatus 100 includes camera 102 present with user 104 and scene 105. Camera 102 may be a digital still camera, an analog camera, or a camera phone. User 104 may comprise a person. Scene 105 may include one or more target objects to be imaged. Scene 105 to be imaged in an example comprises one of: fast action, low light, night, indoor, backlit, portrait, text, sunset, snow, beach, bright outdoor, night portrait, theatre, food, landscape, or close-up scenes. User 104 operates or interacts with camera 102 to capture or record one or more images of scene 105.

Camera 102 includes lens 106, photosensor 108, processor 110, memory 114, and user interface 116. Memory 114 comprises image data module 118 and bracketing logic module 120. User interface 116 comprises shutter button 122 and menu and navigation system 124. One or more components such as user interface 116 and/or memory 114 and/or parts thereof may include an exemplary implementation of an algorithm, procedure, program, process, mechanism, engine, model, coordinator, module, application, software, code, and/or logic.

Figure 2:
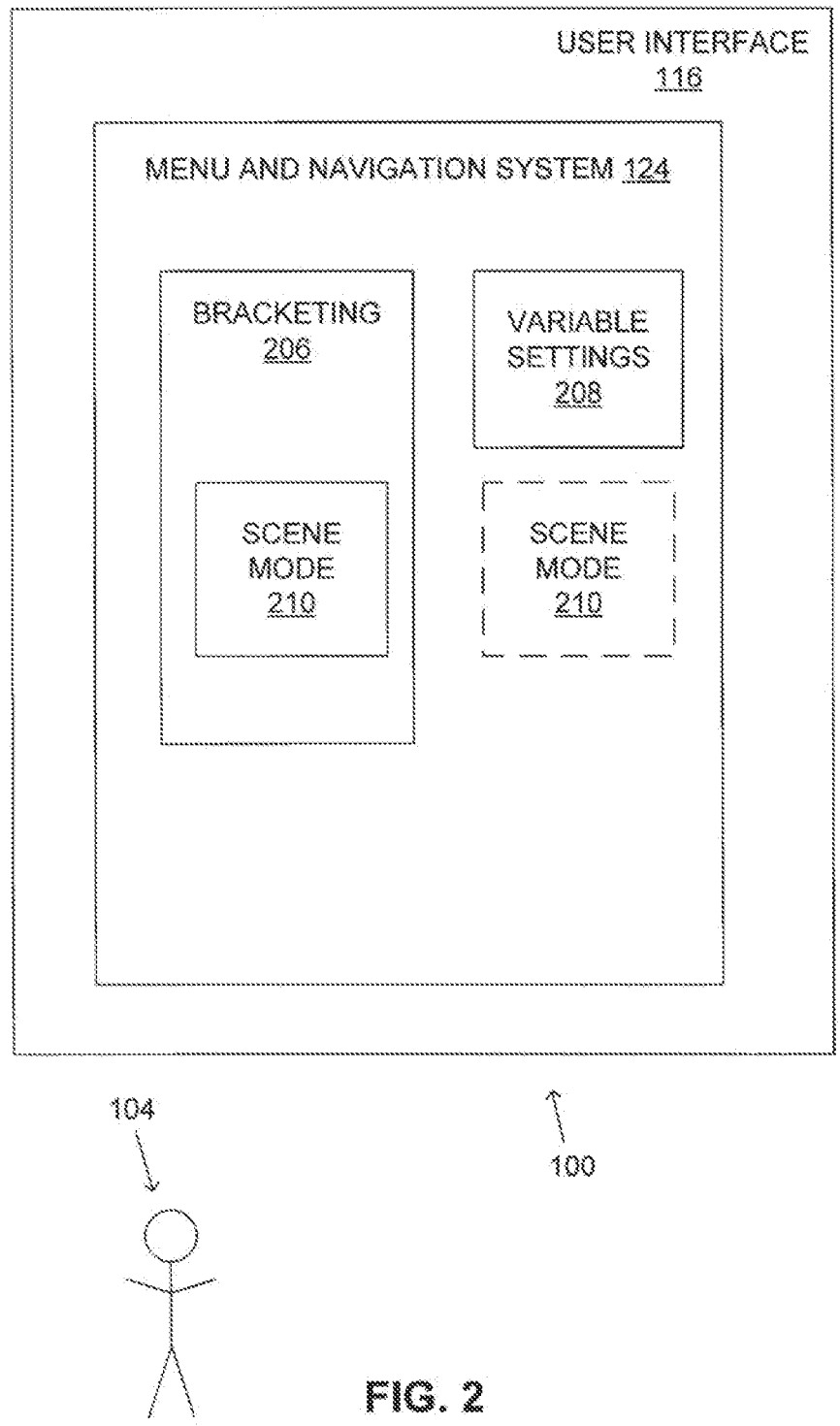
FIG. 2 is a representation of an embodiment of a user interface of the camera present with the user of an embodiment of the apparatus of FIG. 1.

Referring to FIGS. 1 and 2, user interface 116 displays menu and navigation system 124 to user 104. As described herein, user interface 116 may further display for view by user 104 the settings of scene mode 210 of bracketing 206 which bracketing logic module 120 of camera 102 employs to obtain the shot that user 104 selects as a best shot. Menu and navigation system 124 may offer menu options such as bracketing 206. Within the bracketing menu, there may be a plurality of options. For example, user 104 may select scene mode 210 for bracketing. The activation of bracketing 206 by user 104 serves to activate bracketing logic module 120. In another example, user interface 116 comprises an ON/OFF bracketing setting 208 applicable to scene mode 210 selected by user 104, where the scene mode may be located outside bracketing 206.

Lens 106 takes in scene 105 and passes information from scene 105 to photosensor 108. Photosensor 108 continuously captures data. Processor 110 and bracketing logic module 120 perform analysis on scene 105 through employment of the information received from lens 106 and photosensor 108. Image data module 118 is continuously overwritten until user 104 presses shutter button 122 to capture scene 105. Processor 110 controls a feedback loop of bracketing logic module 120 to photosensor 108 to lens 106. When user 104 sets camera 102 for a particular scene mode 210 of bracketing 206, camera 102 takes a plurality, for example, two to five, pictures with a single press of shutter button 122.

Bracketing logic module 120 of camera 102 varies a plurality of settings in the plurality of pictures to attempt to get the best shot of scene 105. Bracketing logic module 120, after receiving a selection by user 104 of type of scene-bracketing for scene 105 and without further input by user 104, picks the one or more different image-capture parameters as best to adjust for each shot of the plurality of bracketed shots for scene 105 based on the previously-input selection by user 104 of the type of scene-bracketing to be used for scene 105. Scene 105 may comprise fast action, low light, night, indoor, backlit, or close-up. Bracketing logic module 120, after receiving an input selection by user 104 of the type of scene-bracketing for scene 105 and without further input by user 104, applies intelligence about scene 105 in setting one or more different image-capture parameters for each shot of the plurality of bracketed shots for scene 105 based on the previously-input selection by user 104 of the type of scene-bracketing for scene 105.

In an embodiment, one of the following parameters, of the plurality of available image-capture parameters, is varied for each shot of the plurality of bracketed shots for scene 105 to be imaged: exposure compensation, ISO Speed, F-number, shutter speed, white balance, color, adaptive lighting, sharpening, saturation, contrast, compression, resolution, red-eye removal, flash, flash compensation, focus distance, zoom, auto focus area, exposure metering, and date imprint. In some embodiments of the invention, camera 102 may take only two shots and vary a plurality of settings between the two shots. Bracketing logic module 120, as a result of an input from user 104 selects of the type of scene-bracketing for scene 105 to be imaged, without further input by user 104, varies two or more different image-capture parameters, of the plurality of available image-capture parameters, to create combinations of two or more different image-capture parameters for each of two shots of the plurality of bracketed shots for scene 105 to be imaged. In another embodiment of the invention, camera 102 creates combination of the two or more different image-capture parameters for each of at least two shots of the plurality of bracketed shots for scene 105.

When user 104 selects an exemplary Action bracketing for scene mode 210 of bracketing 206, bracketing logic module 120 of camera 102 may try the following for three shots:

Shot 1: Flash On, Fastest shutter speed, moderate ISO Speed, Auto Focus, Normal Sharpening Shot 2: Flash On, Fastest shutter speed, highest ISO Speed, Hyperfocus, Normal Sharpening Shot 3: Flash Off, Fastest shutter speed, highest ISO Speed, Auto Focus, Higher Sharpening When user 104 selects an exemplary Low Light bracketing for scene mode 210 of bracketing 206, bracketing logic module 120 of camera 102 may try the following group of shots:

Shot 1: Flash On, all settings at defaults

Shot 2: Flash Off, long exposure

Shot 3: Flash On, Adaptive Lighting On

Shot 4: Flash Off, high ISO Speed

Shot 5: Flash On Adaptive Lighting On, Exposure Compensation+0.3

The first shot may comprise a default or typical setting for scene 105, and subsequent settings by bracketing logic module 120 of camera 102 may become more aggressive in achieving a best shot. For example, in the case of Action bracketing for scene mode 210 of bracketing 206, the subsequent shots may use increasingly higher ISO Speeds, which may result in grainy looking images, but will help stop the action. User 104 may view each of the images taken of scene 105 and pick the one image which came out best. User 104 could also view by display on user interface 116 the settings of scene mode 210 of bracketing 206 which bracketing logic module 120 of camera 102 had used to obtain the shot that user 104 liked, allowing user 104 to learn more about photography.

Bracketing logic module 120, after receiving a user selection of the type of scene-bracketing for scene 105 to be imaged and without further user input, picks the one or more different image-capture parameters as best to adjust for each shot of the plurality of bracketed shots for scene 105 to be imaged based on the previously-input user selection of the type of scene-bracketing for scene 105 to be imaged. In this embodiment, the one or more different image-capture parameters as best to adjust for each shot of the plurality of bracketed shots for scene 105 is conducted on-the-fly while capturing scene 105.

An embodiment of the invention offers novice photographers as users 104 an easy way to try all possible solutions for obtaining a good shot in difficult types of scenes 105. These photographers (users 104) if interested, can grow and learn about the effect of photography controls in camera 102 without ruining or missing other shots of the scene 105, for example, cherished or sentimental shots, while capturing images and learning about photography.

Figure 3:
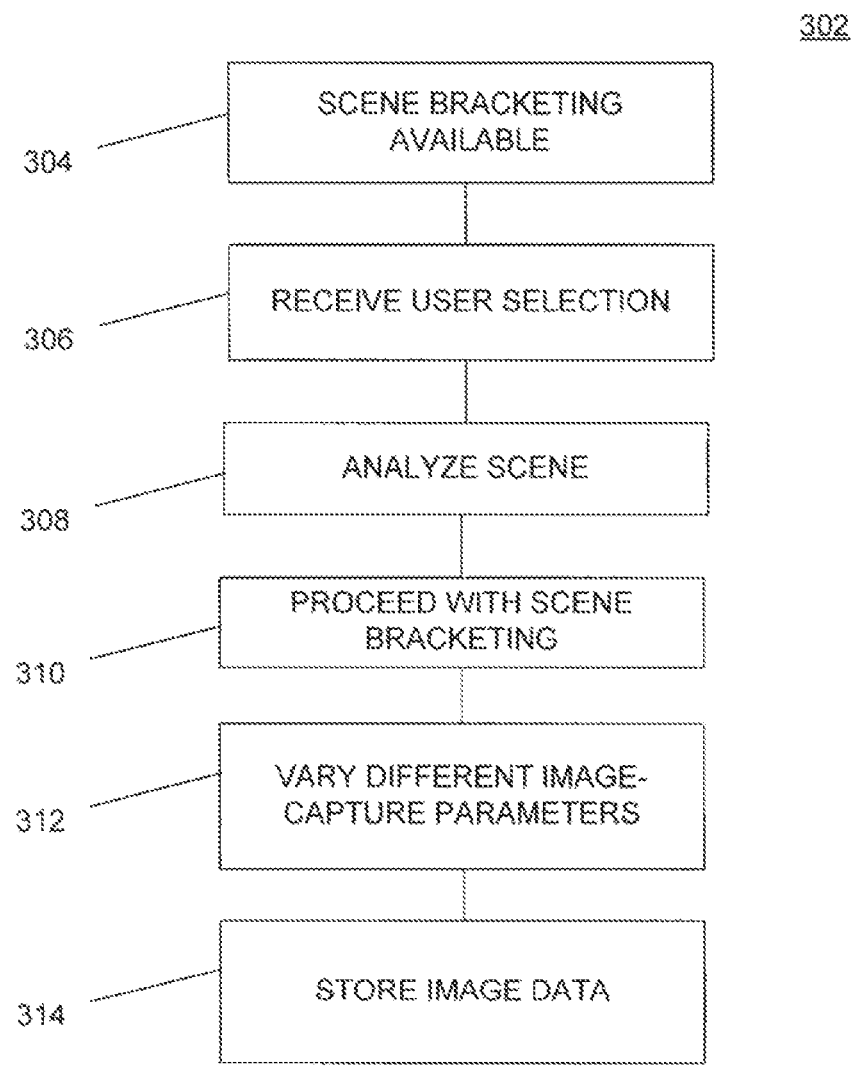
FIG. 3 is a representation of an exemplary logic flow for scene bracketing by the camera of an embodiment of the apparatus of FIG. 1.

An illustrative description of an exemplary operation of an embodiment of apparatus 100 is presented, for explanatory purposes. The arrangement of FIG. 1 is suitable for performing the method of FIG. 3, although other arrangements may be used. The exemplary logic flow of FIG. 302 begins at STEP 304, in which a user interface presents a menu and a navigation system to a user with options for bracketing in a scene mode. At STEP 306 the user interface receives a selection for bracketing in a scene mode from the user. In another embodiment, STEP 306 may entail the user selecting to bracket a scene while in a Scene mode menu.

At STEP 308, a bracketing logic module is executed by a processor to perform analysis on the scene through employment of the information received from a lens 106 and a photosensor. At STEP 310, the bracketing logic module receives notice the user has triggered a shutter button and the bracketing logic module therefore proceeds to actively apply scene bracketing which the bracketing logic module has identified for the scene from analysis of the information about the scene received from the photosensor. At STEP 312, the bracketing logic module varies two or more different image-capture parameters, of a plurality of available image-capture parameters, to create unique combinations of the two or more different image-capture parameters for each of at least three shots of a plurality of bracketed shots for the scene to be imaged by the camera. This approach may serve to obtain a best picture of the currently-selected scene and be repeated with the bracketing to obtain additional best pictures of more scenes.

At STEP 314 the bracketing logic module causes data from a plurality, for example, two to five, pictures to be stored in the image data module with the unique combinations of the two or more different image-capture parameters from the single press of the shutter button by the user. In this step, the camera varies a plurality of settings in the plurality of pictures to attempt to get the best shot for the scene.

In one or more exemplary embodiments, one or more features described herein in connection with one or more components and/or one or more parts thereof are applicable and/or extendible analogously to one or more other instances of the particular component and/or other components in apparatus 100. In one or more exemplary embodiments, one or more features described herein in connection with one or more components and/or one or more parts thereof may be omitted from or modified in one or more other instances of the particular component and/or other components in apparatus 100. An exemplary technical effect is one or more exemplary and/or desirable functions, approaches, and/or procedures. An exemplary component of an embodiment of apparatus 100 employs and/or comprises a set and/or series of computer instructions written in or implemented with any of a number of programming languages, as will be appreciated by those skilled in the art.

An embodiment of apparatus 100 encompasses an article and/or an article of manufacture. The article comprises one or more computer-readable signal-bearing media. The article comprises means in the one or more media for one or more exemplary and/or desirable functions, approaches, and/or procedures.

An embodiment of apparatus 100 employs one or more computer readable signal bearing media. A computer-readable signal-bearing medium stores software, firmware and/or assembly language for performing one or more portions of one or more implementations. An example of a computer-readable signal bearing medium for an embodiment of apparatus 100 comprises a memory and/or recordable data storage medium of memory 114. A computer-readable signal-bearing medium for an embodiment of apparatus 100 in an example comprises one or more of a magnetic, electrical, optical, biological, chemical, and/or atomic data storage medium. For example, an embodiment of the computer-readable signal-bearing medium comprises one or more floppy disks, magnetic tapes, CDs, DVDs, hard disk drives, and/or electronic memory. A computer-readable signal-bearing medium comprises a physical computer medium and/or computer-readable signal-bearing tangible medium.

The steps or operations described herein are examples. There may be variations to these steps or operations without departing from the spirit of the invention. For example, the steps may be performed in a differing order, or steps may be added, deleted, or modified.

Although exemplary embodiment of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A camera, comprising:
    a bracketing logic module that varies, based on a received user input and for at least two bracketed shots for a scene to be imaged, at least two different image-capture parameters, wherein
    the bracketing logic module varies the at least two different image-capture parameters based on previously-input user selections of scene-bracketing for the scene to be imaged, and wherein the at least two different image-capture parameters include at least two of the following:
    ISO Speed, color, adaptive lighting, sharpening, saturation, contrast, compression, resolution, red-eye removal, flash compensation, focus distance, zoom, auto focus area, and date imprint, and
    wherein the bracketing logic module, after receiving the user input, picks, on-the-fly, the at least two different image-capture parameters to adjust the at least two bracketed shots for the scene to be imaged based on a previously-received user input of a type of scene-bracketing for the scene to be imaged.

2. The camera of claim 1, wherein the image-capture parameters further include:
    exposure compensation, F-number, shutter speed, white balance, exposure metering, and flash.

3. The camera of claim 1, wherein the bracketing logic module, after receiving the user input of the type of scene-bracketing for the scene to be imaged, varies the at least two different image-capture parameters to create a combination of two or more different image-capture parameters for each of the at least two bracketed shots for the scene to be imaged.

4. The camera of claim 1, wherein the bracketing logic module performs analysis on the scene to be imaged for variation of the at least two different image-capture parameters using information about the scene to be imaged received from a lens and a photosensor.

5. The camera of claim 1, further comprising:
    a user interface that displays a menu; and
    a navigation system that offers a bracketing option among one or more menu options;
    wherein the selection of scene-bracketing for the scene to be imaged occurs through user selection of one of the group consisting of: selecting a scene mode in the bracketing option at the user interface, and selecting a bracketing option in a scene mode menu at the user interface.

6. The camera of claim 1, wherein upon user selection of Action bracketing for a scene mode in a bracketing option, the bracketing logic module varies at least two image capture parameters selected from the group consisting of: flash, shutter speed, ISO speed, auto focus, and sharpening.

7. The camera of claim 1, wherein upon user selection of Low Light bracketing for a scene, the bracketing logic module varies at least two image capture parameters selected from the group consisting of: exposure compensation, flash, shutter speed, adaptive lighting, and ISO speed.

8. A method comprising:
    varying, after a user selection of scene-bracketing for a scene to be imaged by a camera, two or more different image-capture parameters selected from a plurality of different image-capture parameters, to create a combination of the two or more different image-capture parameters for each of at least two shots of a plurality of bracketed shots for the scene to be imaged by the camera; and
    based on the user selection, picking, on-the-fly, the two or more different image-capture parameters to adjust the at least two shots for the scene to be imaged based on a previously-received user input of a type of scene-bracketing for the scene to be imaged,
    wherein the two or more different image-capture parameters include at least two of the following:
    ISO Speed, color, adaptive lighting, sharpening, saturation, contrast, compression, resolution, red-eye removal, flash compensation, focus distance, zoom, auto focus area, and date imprint.

9. The method of claim 8, wherein the camera comprises one of: a digital still camera, analog camera, or camera phone.

10. The method of claim 8, wherein the varying further comprises:
    employing, in a first shot of the plurality of bracketed shots, a default setting in the plurality of different image-capture parameters for the scene to be imaged upon user selection of a bracketing option as the user selection of a type of scene-bracketing for the scene to be imaged; and
    increasing aggressiveness in achieving a best image in subsequent settings in the plurality of different image-capture parameters for additional shots of the plurality of bracketed shots.

11. The method of claim 8, further comprising:
    receiving a selection of a best image from a plurality of images captured in the plurality of bracketed shots for the scene; and
    displaying settings of the plurality of different image-capture parameters employed to capture the best image on a user interface of the camera.

12. A method, comprising:
    receiving a user selection of scene-bracketing for a scene to be imaged by a camera;
    varying, after the receiving, at least two different image-capture parameters, of a plurality of different image-capture parameters, to create a combination of the at least two different image-capture parameters for each of at least two shots of a plurality of bracketed shots for the scene to be imaged by the camera; and
    based on the received user selection, picking, on-the-fly, the at least two different image-capture parameters to adjust the at least two shots for the scene to be imaged based on a previously-received user input of a type of scene-bracketing for the scene to be imaged,
    wherein the two or more different image-capture parameters include at least two of the following:
    ISO Speed, color, adaptive lighting, sharpening, saturation, contrast, compression, resolution, red-eye removal, flash compensation, focus distance, zoom, auto focus area, and date imprint.

13. The method of claim 12, wherein the varying further comprises:

employing, in a first shot of the plurality of bracketed shots, a default setting in the plurality of different image-capture parameters for the scene to be imaged; and increasing aggressiveness in achieving a best image in subsequent settings in the plurality of different image-capture parameters for additional shots of the plurality of bracketed shots.

14. The method of claim 13, wherein, upon user selection of Action bracketing for a scene mode, increasing the aggressiveness in achieving the best image in subsequent settings in the plurality of different image-capture parameters for the additional shots of the plurality of bracketed shots includes:

employing increasingly higher ISO Speeds in the subsequent settings in the plurality of different image-capture parameters for the additional shots of the plurality of bracketed shots.

15. The method of claim 14, further comprising:

receiving a selection of a best image from a plurality of images captured in the plurality of bracketed shots for the scene; and displaying settings of the plurality of different image-capture parameters employed to capture the best image on a user interface of the camera.

16. A camera, comprising:

a bracketing logic module that varies, without user input and for at least two bracketed shots for a scene to be imaged, at least two different image-capture parameters, wherein the bracketing logic module applies intelligence about the scene to be imaged in picking and setting the at least two different image-capture parameters for the at least two bracketed shots, and wherein the at least two different image-capture parameters include at least two of the following:

ISO Speed, color, adaptive lighting, sharpening, saturation, contrast, compression, resolution, red-eye removal, flash compensation, focus distance, zoom, auto focus area, and date imprint, and wherein the bracketing logic module, picks, on-the-fly, the at least two different image-capture parameters to adjust the at least two bracketed shots for the scene to be imaged based on a previously-received user input of a type of scene-bracketing for the scene to be imaged.

17. The camera of claim 16, wherein the image-capture parameters further include:

exposure compensation, F-number, shutter speed, white balance, exposure metering, and flash.

18. The camera of claim 16, wherein the bracketing logic module varies the at least two different image-capture parameters to create a combination of two or more different image-capture parameters for each of the at least two bracketed shots for the scene to be imaged.

* * * * *